United States Patent
Radhakrishnan

(10) Patent No.: US 9,197,650 B2
(45) Date of Patent: Nov. 24, 2015

(54) PROXY THAT SWITCHES FROM LIGHT-WEIGHT MONITOR MODE TO FULL PROXY

(71) Applicant: Cisco Technology, Inc., San Jose, CA (US)

(72) Inventor: Manju Radhakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 13/826,081

(22) Filed: Mar. 14, 2013

(65) Prior Publication Data

US 2014/0283000 A1 Sep. 18, 2014

(51) Int. Cl.
*H04L 12/803* (2013.01)
*H04L 29/06* (2006.01)
*H04L 12/827* (2013.01)

(52) U.S. Cl.
CPC ................................ *H04L 63/1408* (2013.01)

(58) Field of Classification Search
CPC ... H04L 67/28; H04L 2209/76; H04L 1/1642; G05B 2219/31241; G06F 2212/72096
See application file for complete search history.

(56) References Cited

U.S. PATENT DOCUMENTS

| 6,006,268 A | 12/1999 | Coile et al. |
| 6,473,406 B1 | 10/2002 | Coile et al. |
| 7,054,618 B1 * | 5/2006 | McCullough ............... 455/414.1 |
| 7,451,193 B1 | 11/2008 | Coile et al. |
| 8,069,250 B2 * | 11/2011 | Panjwani et al. ............. 709/227 |
| 2003/0014650 A1 * | 1/2003 | Freed et al. ................... 713/189 |
| 2004/0088423 A1 * | 5/2004 | Miller et al. .................. 709/229 |
| 2006/0029000 A1 * | 2/2006 | Waldvogel .................... 370/254 |
| 2006/0248582 A1 * | 11/2006 | Panjwani et al. ............... 726/13 |
| 2009/0132714 A1 * | 5/2009 | Blander et al. ................ 709/227 |
| 2010/0158026 A1 * | 6/2010 | Valmikam et al. ............ 370/401 |
| 2013/0111053 A1 * | 5/2013 | Perreault et al. .............. 709/231 |

* cited by examiner

*Primary Examiner* — Venkat Perungavoor
(74) *Attorney, Agent, or Firm* — Edell, Shapiro & Finnan, LLC

(57) ABSTRACT

The packets of a communication session between a first device and a second device are monitored at proxy device. A determination is made that full proxy services should be applied to the communication session at the proxy device. After the determination, a packet of a first exchange, the first exchange being initiated prior to the determination, is passed through the proxy device. After the determination, full proxy services are applied to a packet of a second exchange, the second exchange being initiated after the determination.

28 Claims, 6 Drawing Sheets

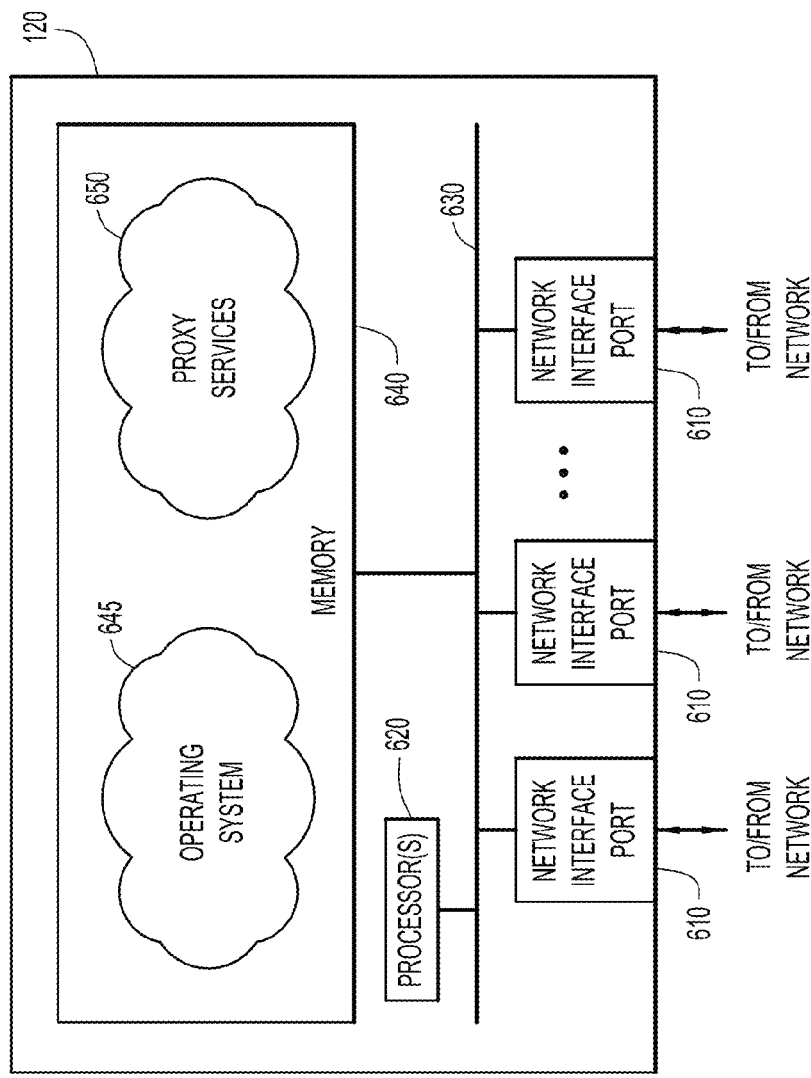

PROXY THAT SWITCHES FROM LIGHT-WEIGHT MONITOR MODE TO FULL PROXY

TECHNICAL FIELD

The present disclosure relates to network security, and proxy devices in particular.

BACKGROUND

Proxy devices operate by intercepting network traffic flows between clients and servers. Once intercepted in, for example, a transmission control protocol, the packets may be inspected so that malicious communications can be prevented from reaching their desired destinations. Proxy devices may also help prevent data fragmentation by ensuring dropped packets are successfully retransmitted and acknowledged. The proxy device will copy the packets of the network traffic, locally storing the copies of the packets. The proxy device will then take responsibility for acknowledgement and retransmission of the packets. Only after the packets have been acknowledged will the copied packets be deleted at the proxy device.

When multiple connections are proxied through a single device, the memory and computing demands on the proxy device can result in degraded performance of network transmissions. Specifically, high network traffic will require the proxy to store a high volume of packets. If the traffic demands exceed the memory or computing abilities of the device, network traffic performance will suffer.

BRIEF DESCRIPTION OF THE DRAWINGS

FIG. 6 is an example block diagram of a network device configured to perform switching from a lightweight monitoring mode to a full proxy mode, and vice versa.

DESCRIPTION OF EXAMPLE EMBODIMENTS

Overview

The packets of a communication session between a first device and a second device are monitored at a proxy device. A determination is made that full proxy services should be applied to the communication session at the proxy device. After the determination, a packet of a first exchange, the first exchange being initiated prior to the determination, is passed through the proxy device. After the determination, full proxy services are applied to a packet of a second exchange, the second exchange being initiated after the determination.

Example Embodiments

Figure 1:
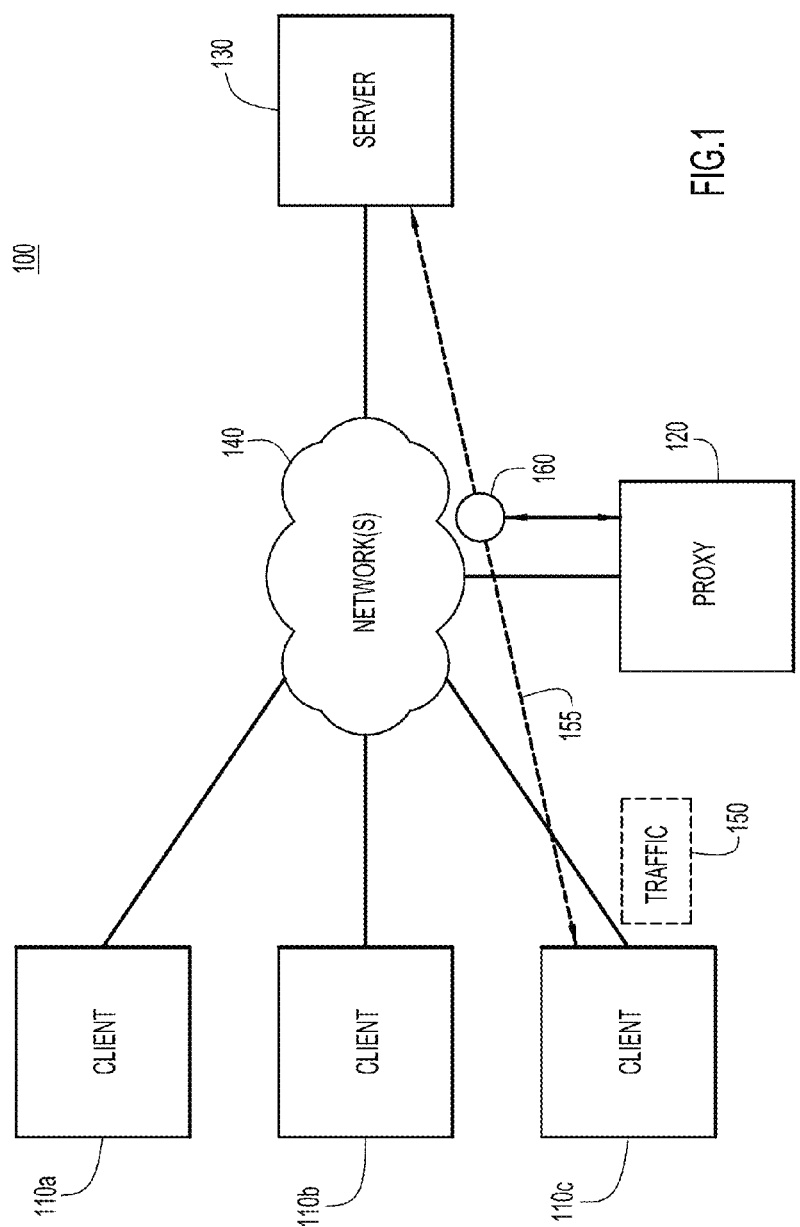
FIG. 1 illustrates an example computer network in which a proxy device switches from a lightweight monitoring mode to a full proxy mode, and vice versa.

Depicted in FIG. 1 is an example network environment 100 configured for transitioning between lightweight monitoring and full proxy services modes. Clients 110a-c are connected to proxy 120, and in turn, to server 130 through network 140. Proxy device 120 will intercept traffic 150 of communication session 155, applying proxy services 160 to traffic 150. Providing full proxy services to all traffic 150 that crosses network 140 may place large resource demands on proxy device 120. Furthermore, depending on the content of traffic 150, full proxy services may not be necessary. For example, if clients 110a-c and server 130 all have reputations as being trustworthy, the benefit of applying full proxy services to traffic 150 may be outweighed by the resource demands that are placed on proxy device 120. On the other hand, allowing clients 110a-c and server 130 to communicate without any monitoring may open them up to malicious attacks. Accordingly, proxy 120 is configured to transition between a lightweight monitoring mode and a full proxy services mode, and back again, for communication sessions between any of the clients 110a-c and server 130. Both the lightweight monitoring and full proxy services are applied to traffic 150 of communication session 155 through proxy services 160.

Accordingly, when traffic 150 is unsuspicious, proxy 120 may operate in a lightweight monitoring mode. On the other hand, if traffic 150 becomes suspicious, fragmented, or otherwise in need of full proxy services, proxy device 120 may switch from the lightweight monitoring mode to a full proxy services mode. Similarly, proxy device 120 may convert back to the lightweight mode when full proxy services are no longer needed.

In the lightweight monitoring mode, traffic 150, for example a transmission control protocol (TCP) packet, is passed through the proxy device 120 without modification of the packet. For example, in a TCP implementation, the TCP packet header may not be modified, meaning the source, destination, sequence number, and acknowledgment number fields of the TCP header will not be modified. Furthermore, traffic 150 may not be stored at proxy device 120, and clients 110a-c and server 130 will remain responsible for receiving and/or tracking acknowledgments and sending retransmissions for the traffic they send. In other words, proxy device 120 passively monitors traffic 150. Because traffic 150 is passed through proxy device 120 without being stored, modified, or recreated, the resources expended by proxy device 120 may be reduced, and traffic speeds may be increased.

In full proxy services mode, proxy device 120 will actively participate in the communications between clients 110a-c and server 130. For example, proxy device 120 may provide deeper inspection of traffic 150, take responsibility for retransmission of packets not received at their destination, and/or take responsibility for receiving acknowledgements of received packets. In order to take these responsibilities, proxy 120 may store a copy of the data sent in traffic 150, modifying the traffic as necessary. For example, in the TCP context, proxy device 120 may alter the TCP packet header fields such as the sequence number, timestamp, and acknowledgement number fields. Furthermore, the full proxy mode may provide deeper inspection of the data payload of traffic 150.

In order to successfully transition from the lightweight monitoring mode to the full proxy services mode, proxy device 120 may need to operate in a mixed mode in which lightweight monitoring is applied to some traffic at the same time full proxy services are applied to other traffic. For example, communication session 150 may comprise an exchange of packets that starts in the lightweight monitoring mode, but includes packets sent after it is determined that fully proxy services should be applied to communication session 150. Packets completing the exchange may still receive lightweight monitoring even after the determination has been made to switch to the full proxy services mode. Examples of how proxy device 120 may transition from the lightweight monitoring mode to the full proxy services mode are described in more detail hereinafter in connection with FIGS. 2-5.

Figure 2:
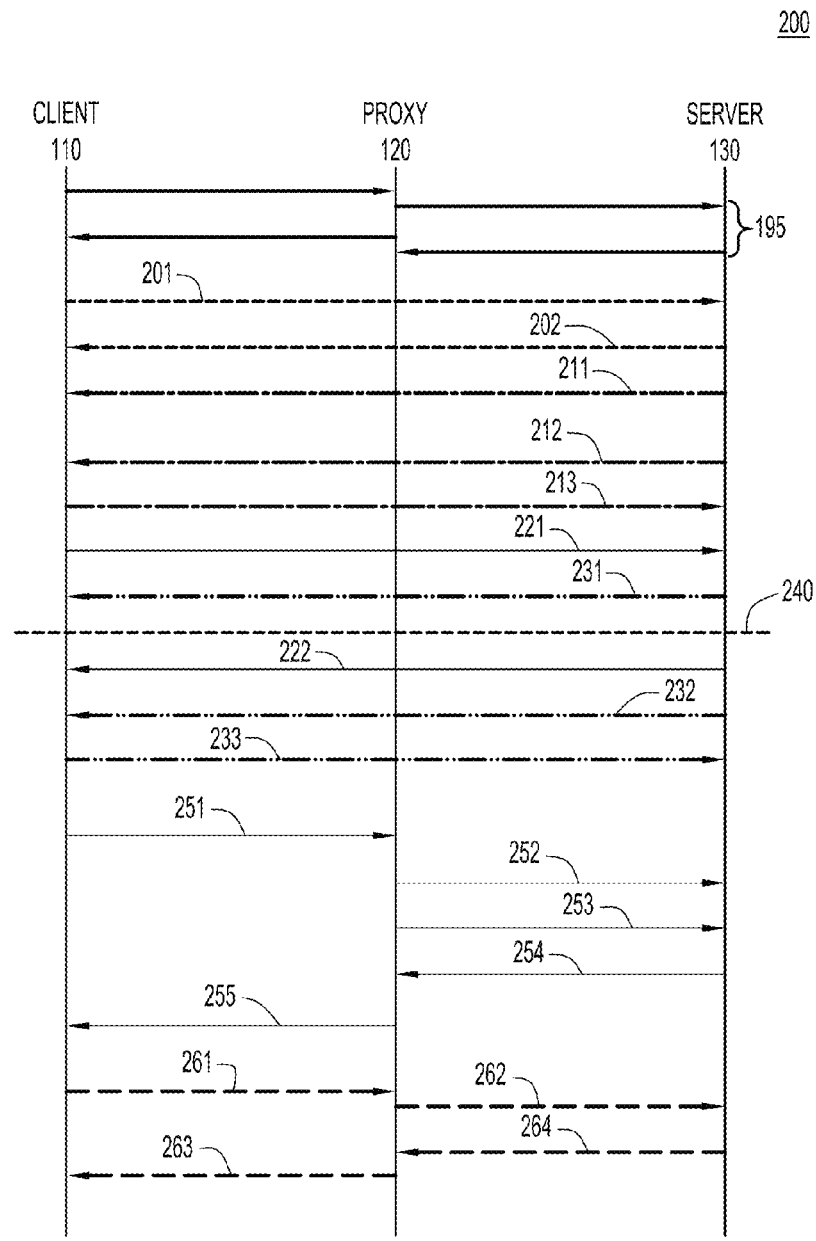
FIG. 2 illustrates an example ladder diagram switching from a lightweight monitoring mode to a full proxy mode.

With reference now made to FIG. 2, a ladder diagram 200 is illustrated in which proxy 120 transitions between lightweight monitoring and full proxy services for a communication session between client 110 and server 130. When a communication session between client 110 and server 130 is initially established, a three-way handshaking procedure 195 is performed by the client 110, proxy device 120, and server 130. During the handshaking procedure 195, the proxy device may remove any non-standard network protocol options, for example, TCP protocol options, while maintaining the transmission window size and time stamps for the client 110 and server 130 transmissions.

After handshaking procedure 195, proxy 120 initially provides lightweight monitoring of the traffic between client 110 and server 130. Accordingly, when message 201 is sent, proxy 120 will monitor the message, and may examine the contents of the message, but the message is not stored or recreated by proxy 120. Instead, message 201 is passed through to server 130 by proxy 120. Specifically, proxy 120 may comprise inspectors which view the contents of message 201, but do so without recreating the message, and without modifying its contents, such as packet headers, thereby preserving resources of proxy 120.

When server 130 acknowledges receipt of message 201 with message 202, message 202 is not recreated or stored at proxy 120, and is instead passed through to client 110. Similarly, when server sends message 211, message 211 is passed through proxy 120 to client 110 without being recreated at proxy 120. If server 130 fails to receive an acknowledgment from client 110 that message 211 has been received, server 130 will send retransmission message 212 which will also pass through proxy 120, as will the acknowledgment message 213.

Messages 201 and 202 comprise an "exchange" as used herein, as the two messages taken together indicate the successful transmission of data from a first device to a second device. For example, absent message 202, client 110 would not consider message 201 as having been successfully received by server 130. Similarly, messages 211-213 are considered an "exchange" for the purposes of this disclosure because all three messages are required to ensure the successful receipt of the data contained in message 211 at client 110.

Subsequent to the sending of message 221 from client 110 to server 130, and also subsequent to the sending of message 231 from server 130 to client 110, a determination 240 is made to begin applying full proxy services to messages sent between client 110 and server 130. The determination 240 may be made in response to multiple triggers. For example, the application data sent between the client 110 and the server 130 may become segmented. According to other examples, the monitoring performed by proxy 120 in the lightweight monitoring mode may indicate that the data sent between client 110 and server 130 is suspicious. Whatever the trigger, upon making the determination, the proxy device 120 may initially act in a mixed mode in which any exchanges initiated prior to the determination will continue to receive lightweight monitoring, while exchanges initiated after the determination are examined according to full proxy services.

For example, message 221 was sent prior determination 240. Accordingly, even though receipt acknowledgement 222 from server 130 is received by proxy 120 after determination 240, acknowledgement 222 will be passed through to client 110 as if the lightweight monitoring mode was still in effect. Similarly, retransmission message 232, a retransmission of message 231, and acknowledgment message 233, an acknowledgment of retransmission message 232, are treated as if the lightweight monitoring mode is in effect. Specifically, retransmission message 232 and acknowledgment message 233 are passed through proxy 120 because they are associated with message 231 which was sent prior to determination 240.

On the other hand, when message 251, which is sent after determination 240, is received at proxy 120, proxy 120 will apply full proxy services to message 251, as well as any messages associated with message 251. As part of the full proxy services, proxy 120 may perform an inspection of message 251, and also take responsibility for retransmission and acknowledgment of the data contained in message 251. Accordingly, proxy 120 may store a copy of the data contained in message 251, and send this data to server 130 through message 252. A time lag is shown between the receipt of packet 251 at proxy 120 and the sending of packet 252 from 120 to illustrate the use of resources of proxy 120. If server 130 fails to send an acknowledgment of message 252, proxy device 120 will send retransmission message 253, which server 130 acknowledges through acknowledgment message 254. Furthermore, because proxy 120 has taken responsibility for the retransmission and/or acknowledgement of message 251, acknowledgment message 255 is sent from proxy 120 to client 110 indicating to client 110 that it has completed its necessary part in the transmission of the data contained in message 251. In fact, while acknowledgement 255 is shown being sent after acknowledgement message 254, acknowledgement message 255 is sent independent from acknowledgment message 254. Accordingly, acknowledgement message 255 may be sent prior to receipt of acknowledgment message 254 at proxy 120.

Proxy 120 will continue to apply full proxy services for communications between client 110 and server 103, as illustrated through messages 261-264. Specifically, message 261 is intercepted and recreated at proxy 120. The data contained in message 261 is forwarded to server 130 through message 261, and proxy 120 acknowledges message 261 through message 263. Upon receipt, server 130 acknowledges message 262 through acknowledgment message 264.

For the purposes of this disclosure, messages 251-255 comprise an exchange when full proxy services are being applied to the messages because all five messages are necessary to indicate that the data of message 251 was successfully received at server 130. Similarly, messages 261-264 comprise an exchange because all four messages are required to indicate that the data sent in message 261 was received by server 130.

If client 110, proxy 120 and server 130 operate according to the transmission control protocol (TCP), determination 240 may be made by selecting a sequence number after which full proxy services are to be applied. Proxy 120 may make determination 240 based on monitoring performed in the lightweight monitoring mode. According to other examples, determination 240 may be otherwise made, such as proxy 120 responding to a command from a network administrator. In response to determination 240, messages associated with sequence numbers greater than the determined number will have full proxy services applied to them, while messages up to and including the determined sequence number will be treated as if proxy 120 is operating in lightweight mode.

Figure 3:
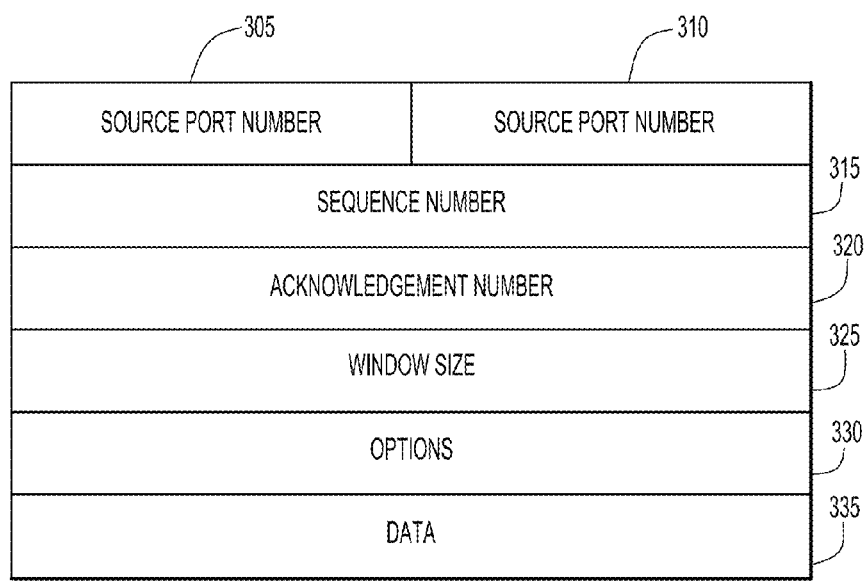
FIG. 3 illustrates an example transmission control protocol packet.

Turning briefly to FIG. 3, depicted therein is TCP packet 300. Packet 300 comprises a number of data fields including source port 305 identifying the source of the message, destination port 310 identifying the destination of the message, sequence number 315 identifying the packet sequence number of the sending device, and acknowledgement number 320 which indicates the packets which a receiving device may be acknowledging with the packet. Additional fields include the window size 325 for the exchange, options 330, and the data payload 335.

When data packets such as packet 300 of FIG. 3 make up the messages of FIG. 2, sequence number 315 and acknowledgment number 320 may be used in determining which packets receive full proxy services and which packets receive lightweight proxy services. For example, returning to FIG. 2, when the determination 240 is made that full proxy services should be applied, the determination may include determining a client sequence number of messages sent from client 110 after which full proxy services should be applied. Accordingly, messages sent from client 110 with sequence numbers greater than the determined client sequence number will have full proxy services applied to them. Messages sent by proxy 110 having sequence numbers less than or equal to the determined client sequence number will have lightweight monitoring applied to them, and they will pass through proxy 120. Because server 130 and client 110 may utilize difference sequence numbers, determination 240 may also include determining a server sequence number for messages sent from server 130. Packets having sequence numbers greater than the determined server sequence number will have full proxy services applied to them, while messages sent by server 130 having sequence numbers less than or equal to the determined server sequence number will have lightweight monitoring applied to them.

Retransmission messages, such as message 232 will have the same sequence number as the initially transmitted message, such as message 231. Accordingly, retransmission messages will pass through proxy 120 if the initial message has a sequence number less than or equal to the determined sequence number.

Acknowledgement messages, on the other hand, may require further evaluation before it can be determined whether or not a message should pass through proxy 120 or have full proxy services applied to it. For example, message 222 is sent from server 130 to client 110 to acknowledge receipt of message 221. Because message 221 is sent prior to determination 240, acknowledgment message 222 should pass through proxy 120 without having full proxy services applied to it. Yet, message 222 is sent after determination 240, and therefore its server sequence number may be greater than the determined server sequence number. Accordingly, proxy 120 will look to the acknowledgement number, for example acknowledgment number 320 of FIG. 3, before determining whether message 222 should have full proxy services applied to it, or whether the message should be passed through to client 110. Specifically, the acknowledgment number for message 222 will show an association with message 221. Because message 221 was sent prior to determination 221, and has a sequence number less than or equal to the determined client sequence number, the association between message 222 and message 221 indicated by the acknowledgment number of message 222 tells proxy 120 to pass message 222 through to client 110. Therefore, even if the sequence number for message 222 would indicate that it may be appropriate to apply full proxy services to the message, the association to message 221 created by the acknowledgment number tells proxy 120 to pass message 222 through to client 110.

In specific examples, the acknowledgement number may not equate exactly to the sequence number of the message it is acknowledging. For example, in a TCP environment, the acknowledgement number may be the sequence number of the message it is acknowledging incremented by one. For example, message 221 may have a sequence number of "5," the determined client sequence number determined in determination 240 may also have a value of "5," while the acknowledgment number of message 222 will have a value of "6." Nevertheless, because proxy 120 understands that the acknowledgement number in a TCP environment is one greater than the sequence number of the packet it is acknowledging, proxy 120 will pass message 222 through to client 110.

Additionally, in the TCP environment, a single TCP segment can include some data which is monitored according to the lightweight monitoring mode, and other data which is monitored according to the fully proxy services mode. Accordingly, the packet is split, the light weight data is sent directly to its destination and the full proxy data is processed by according to the full proxy services mode.

Furthermore, depending on its specifications, proxy device 120 may be able to handle more or less traffic than client 110 and server 130. Accordingly, after determination 240 when proxy 120 has taken responsibility for retransmission and acknowledgment of messages between client 110 and server 130, proxy 120 may wish to alter the window size for the exchanges. The window size places a limit on the amount of data that may be stored at the sending or receiving device, ensuring that no more data than can be acknowledged or retransmitted will be sent. When proxy 120 takes over responsibility for acknowledgement and retransmission of messages between client 110 and server 130, the resources available to proxy 120 may differ from those of the sending and receiving devices. For example, proxy 120 may wish to gradually decrease the window size for the transmissions it is responsible for acknowledging and retransmitting, thereby decreasing the amount of data it needs to store. In order to change the window, proxy 120 may alter the window size from the size originally used by client 110 and server 130. In a TCP environment, the window size may be altered by changing the window field 325 as illustrated in the packet header illustrated in FIG. 3.

Figure 4:
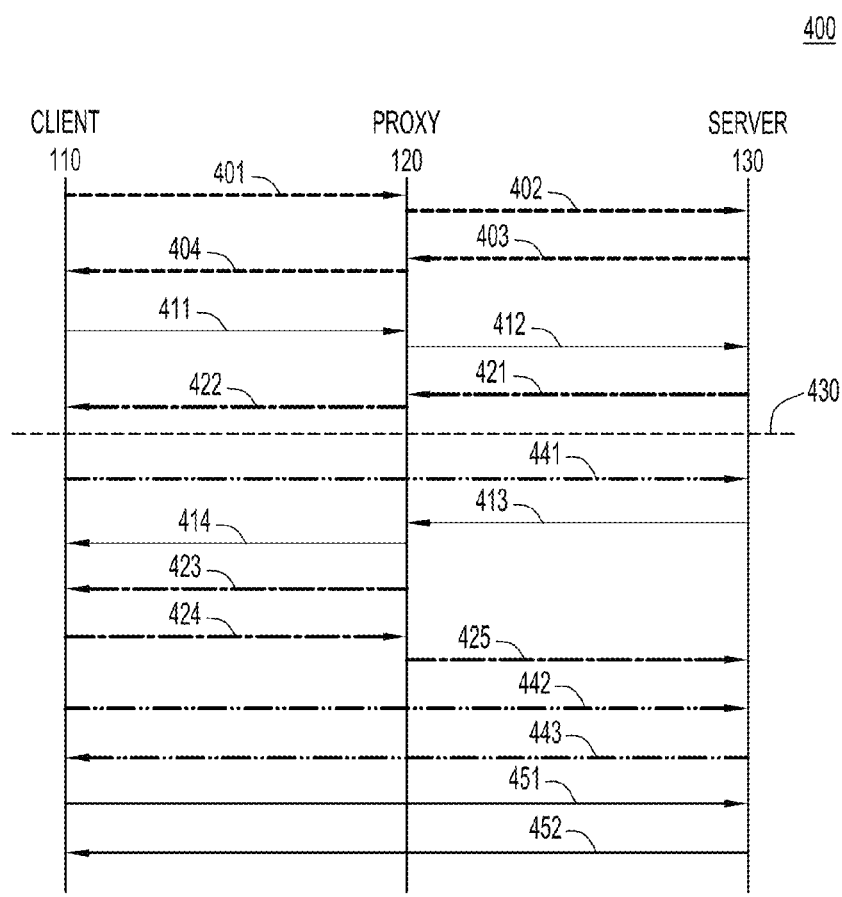
FIG. 4 illustrates an example ladder diagram for switching from a full proxy mode to a lightweight monitoring mode.

With reference now made to FIG. 4, depicted therein is a ladder diagram illustrating a system in which proxy 120 is already operating in the full proxy mode. Accordingly, when message 401 is sent from client 110 to server 130, the message is intercepted by proxy 120. Proxy 120 takes responsibility for acknowledgment and retransmission of the data contained in message 401. Accordingly, proxy 120 may store a copy of the data contained in message 401. Proxy 120 subsequently sends message 402 to server 130, receives acknowledgment message 403 from server 130, and sends acknowledgment message 404 back to client 110. Additionally, proxy 120 begins applying full proxy services to message 411 sent from client 110 to server 130 by copying the data included in message 411 and sending message 412 to server 412. Similarly, proxy 120 begins applying full proxy services to message 421 sent from server 130 to client 110, creating a copy of the data contained in message 421, and sending the data to client 110 through message 422.

During the application of full proxy services, determination 430 is made to return to the lightweight monitoring mode. This determination may be the result of one or more triggers. For example, the previous application of full proxy services may allow proxy 120 to conclude that the transmissions between client 110 and server 130 are not suspicious. According to other examples, the application of the data sent between client 110 and server 130 may have changed, or the data may no longer be fragmented. Whatever the reason, determination 430 is an indication to proxy 120 that future exchanges between client 110 and server 130 should only have lightweight monitoring applied to them. Accordingly, when message 441 is sent from client 110 to server 130, the message is passed through proxy 120 to server 130 without recreation or modification by proxy 120.

On the other hand, message 413, which is the acknowledgment of message 412 sent from server 130 to proxy 120, is associated with a message sent prior to determination 430. Accordingly, full proxy services are applied to message 413. Specifically, proxy device 120 intercepts message 413, and sends new message 414 to client 110 acknowledging successful transmission of the data contained in original message 411. Similarly, message 423, which is a retransmission of message 422, has full proxy services applied to it. Subsequently, message 424 which is sent from client 110 to proxy 120 to acknowledge message 423, as well as message 425 sent from proxy 120 to server 130 in order to acknowledge message 421, both have full proxy services applied to them.

Messages which are part of exchanges that are initiated after determination 430 are passed through proxy 120 without being recreated or modified by proxy 120. For example, message 441, its retransmission message 442, and its acknowledgment message 443 all pass through proxy 120 without recreation or modification. Similarly, message 451 and its acknowledgment 452 also pass through proxy 120 without recreation or modification.

Figure 5:
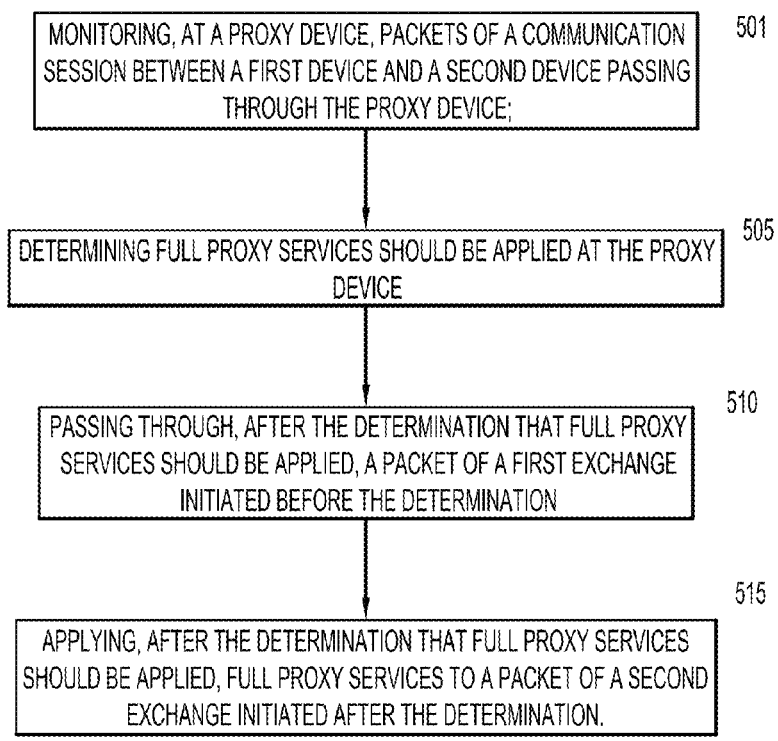
FIG. 5 is a flowchart that illustrates an example procedure for switching from a lightweight monitoring mode to a full proxy mode.

With reference now made to FIG. 5, depicted therein is a flow chart illustrating a method switching between lightweight monitoring and full proxy services for a communication session between a first and second device. The method begins in step 501 in which packets of a communication session between a first device and a second device are monitored at a proxy device. The first device and second device may comprise a client/server system as described above with reference to FIGS. 2-4. Depending on the source of the packet, both the client and the server may serve as the first or second device. Furthermore, the communication session may comprise a TCP connection between the first device and second device. The monitoring of step 501 may comprise examining the contents of the packets without modifying them before passing the packets through to the second device.

In step 505 a determination is made that full proxy services should be applied at the proxy device. The determination may be made based on a determination that the monitored packets are suspicious (i.e. the uniform resource locator of one of the devices has a poor reputation), that the data being sent through the monitored packets is fragmented, or other triggers, such as the application utilizing the data sent through the packets. According to some specific examples, the determination may include determining a packet sequence number such that packets having a sequence number greater than the determined number have full proxy services applied to them.

In step 510, after the determination that full proxy services should be applied, a packet of an exchange initiated prior to the determination will be passed through the proxy device. For example, retransmissions of packets sent before the determination that full proxy services should be applied will be passed through to their destination device without having full proxy services applied to them. Similarly, acknowledgments of packets sent prior to the determination will be passed through to their destination device without having full proxy services applied to them.

In step 515, after the determination that full proxy services should be applied, full proxy services are applied to packets of exchanges that are initiated after the exchange. For example, if an initial packet of an exchange is sent after the determination, full proxy services will be applied to retransmission and acknowledgments of the initial packet.

Subsequent to step 515, a determination may be made that full proxy services should no longer be applied at the proxy device. Nevertheless, full proxy services may still be applied to packets associated with exchanges that were initiated prior to the determination that full proxy services should no longer be applied. For example, if the initial packet of an exchange was sent when full proxy services were being applied to packets, retransmission and acknowledgments of the initial packet will continue to have full proxy services applied to them even after the determination is made that full proxy services will not be applied to the packets of new exchanges.

Turning now to FIG. 6, depicted therein is an example block diagram of a network device, e.g., a proxy device 120, configured to perform the techniques described herein in connection with FIGS. 1-5. The proxy device 120 comprises network interface ports 610, processor(s) 620, bus 630, and memory 640. For simplicity, the network interface ports 610 may be referred to collectively as a network interface unit. The memory 640 contains software instructions for operating system 645 and proxy services logic 650.

Memory 640 may comprise read only memory (ROM), random access memory (RAM), magnetic disk storage media devices, optical storage media devices, flash memory devices, electrical, optical, or other physical/tangible (e.g., non-transitory) memory storage devices. The processor 620 is, for example, a microprocessor or microcontroller that executes instructions for the proxy device logic. Thus, in general, the memory 640 may comprise one or more tangible (non-transitory) computer readable storage media (e.g., a memory device) encoded with software comprising computer executable instructions and when the software is executed (by the processor 620), and in particular proxy services logic 650, it is operable to perform the operations described herein in connection with FIGS. 1-5.

The above description is intended by way of example only.

What is claimed is:

1. A method comprising:
passively monitoring, at a proxy device, packets passing through the proxy device of a communication session between a first device and a second device;
determining full proxy services should be applied to the communication session at the proxy device, wherein determining comprises determining packets associated with a sequence number greater than a determined number are to have full proxy services applied to them, and packets associated with a sequence number less than or equal to the determined sequence number will pass through the proxy device;
passing through the proxy device, after the determination that full proxy services should be applied, a packet of a first exchange initiated prior to the determination; and
actively applying at the proxy device, after the determination that full proxy services should be applied, full proxy services to a packet of a second exchange initiated after the determination.

2. The method of claim 1, wherein passing through the packet of the first exchange comprises passing through the proxy device an acknowledgement of a packet sent prior to the determination.

3. The method of claim 1, wherein passing through the packet of the first exchange comprises passing through the proxy device a retransmission of a packet sent prior to the determination.

4. The method of claim 3, further comprising passing through the proxy device an acknowledgment of the retransmission through the proxy device.

5. The method of claim 1, wherein packets associated with a sequence number comprise sent packets, retransmissions of sent packets and acknowledgements of sent packets.

6. The method of claim 1, further comprising:
determining full proxy services should not be applied to the communication session;
actively applying, after the determination that full proxy services should not be applied, full proxy services to a packet of a third exchange initiated before the determination that full proxy services should not be applied; and
passively monitoring and passing through the proxy device, after the determination that full proxy services should not be applied, a packet of a fourth exchange initiated after the determination that full proxy services should not be applied.

7. The method of claim 6, wherein applying full proxy services to the packet of the third exchange comprises applying full proxy services to an acknowledgement of a packet sent prior to the determination that full proxy services should not be applied.

8. The method of claim 6, wherein applying full proxy services to the packet of the third exchange comprises applying full proxy services to a retransmission of a packet sent prior to the determination that full proxy services should not be applied.

9. The method of claim 1, wherein applying the full proxy services comprises changing a first window size determined according to the first or second device to a second window size determined by the proxy device.

10. The method of claim 1, wherein passively monitoring packets of the session comprises passively monitoring the packets and passing the packets through the proxy device to the second device.

11. The method of claim 1, wherein applying full proxy services to the packet of the second exchange comprises:
recreating the packet of the second exchange;
storing a copy of the recreated packet at the proxy device; and
sending the recreated packet to the second device.

12. The method of claim 1, wherein the communication session comprises a transmission control protocol connection.

13. An apparatus comprising:
a network interface unit configured to enable communications over a network;
a memory; and
a processor coupled to the memory and the network interface unit, and configured to:
passively monitor packets passing through the apparatus of a communication session between a first device and a second device;
determine full proxy services should be applied to the communication session by determining packets associated with a sequence number greater than a determined number are to have full proxy services applied to them, and packets associated with a sequence number less than or equal to the determined sequence number will pass through the apparatus;
pass through, after the determination that full proxy services should be applied, a packet of a first exchange initiated before the determination;
actively apply, after the determination that full proxy services should be applied, full proxy services to a packet of a second exchange initiated after the determination.

14. The apparatus of claim 13, wherein the processor is configured to monitor a transmission control protocol connection.

15. The apparatus of claim 13, wherein the processor is further configured to:
determine full proxy services should not be applied to the communication session;
actively apply, after the determination that full proxy services should not be applied, full proxy services to a packet of a third exchange initiated before the determination that full proxy services should not be applied; and
passively monitor and pass through the apparatus, after the determination that full proxy services should not be applied, a packet of a fourth exchange initiated after the determination that full proxy services should not be applied.

16. The apparatus of claim 13, wherein the processor is further configured to:
recreate the packet of the second exchange;
store a copy of the recreated packet; and
send the recreated packet to the second device.

17. A tangible computer readable storage media encoded with instructions that, when executed by a processor, cause the processor to:
passively monitor packets passing through a proxy device of a communication session between a first device and a second device;
determine full proxy services should be applied to the communication session by determining packets associated with a sequence number greater than a determined number are to have full proxy services applied to them, and packets associated with a sequence number less than or equal to the determined sequence number will pass through the proxy device;
pass through the proxy device, after the determination that full proxy services should be applied, a packet of a first exchange initiated before the determination;
actively apply at the proxy device, after the determination that full proxy services should be applied, full proxy services to a packet of a second exchange initiated after the determination.

18. The tangible computer readable storage media of claim 17, wherein the instructions cause the processor to passively monitor a transmission control protocol connection.

19. The tangible computer readable storage media of claim 17, wherein the instructions cause the processor to:
recreate the packet of the second exchange;
store a copy of the recreated packet; and
send the recreated packet to the second device.

20. The apparatus of claim 13, wherein the processor is configured to pass through the packet of the first exchange by passing through an acknowledgement of a packet sent prior to the determination.

21. The apparatus of claim 13, wherein the processor is configured to pass through the packet of the first exchange by passing through a retransmission of a packet sent prior to the determination.

22. The apparatus of claim 13, wherein packets associated with a sequence number comprise sent packets, retransmissions of sent packets and acknowledgements of sent packets.

23. The tangible computer readable storage media of claim 17, wherein the instructions cause the processor to pass through the packet of the first exchange by passing through an acknowledgement of a packet sent prior to the determination.

24. The tangible computer readable storage media of claim 17, wherein the instructions cause the processor to pass through the packet of the first exchange by passing through the proxy device a retransmission of a packet sent prior to the determination.

25. The tangible computer readable storage media of claim 17, wherein the instructions further cause the processor to:
- determine full proxy services should not be applied to the communication session;
- actively apply, after the determination that full proxy services should not be applied, full proxy services to a packet of a third exchange initiated before the determination that full proxy services should not be applied; and
- passively monitor and pass through the apparatus, after the determination that full proxy services should not be applied, a packet of a fourth exchange initiated after the determination that full proxy services should not be applied.

26. The apparatus of claim 15, wherein the processor is configured to apply full proxy services to the packet of the third exchange by applying full proxy services to an acknowledgement of a packet sent prior to the determination that full proxy services should not be applied.

27. The tangible computer readable storage media of claim 25, wherein the instructions further cause the processor to apply full proxy services to the packet of the third exchange by applying full proxy services to an acknowledgement of a packet sent prior to the determination that full proxy services should not be applied.

28. The tangible computer readable storage of claim 17, wherein packets associated with a sequence number comprise sent packets, retransmissions of sent packets and acknowledgements of sent packets.

\* \* \* \* \*